(12) United States Patent
Jain et al.

(10) Patent No.: US 7,529,198 B2
(45) Date of Patent: May 5, 2009

(54) SCALABLE OVERLAY NETWORK

(75) Inventors: Kamal Jain, Bellevue, WA (US); Laszlo Lovasz, Bellevue, WA (US); Philip A. Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 516 days.

(21) Appl. No.: 11/101,121

(22) Filed: Apr. 7, 2005

(65) Prior Publication Data
US 2006/0251062 A1 Nov. 9, 2006

(51) Int. Cl.
*H04L 12/28* (2006.01)
*H04J 3/24* (2006.01)
*H04J 3/00* (2006.01)

(52) U.S. Cl. .................. 370/256; 370/392; 370/393; 370/473; 370/475; 370/476

(58) Field of Classification Search ............. 370/351, 370/389, 464, 465, 473, 477, 254–258
See application file for complete search history.

(56) References Cited

U.S. PATENT DOCUMENTS

| | | | |
|---|---|---|---|
| 6,226,296 B1 * | 5/2001 | Lindsey et al. ............ 370/401 |
| 6,505,169 B1 * | 1/2003 | Bhagavath et al. ............ 705/14 |
| 2003/0074402 A1 * | 4/2003 | Stringer-Calvert et al. .. 709/203 |
| 2003/0110296 A1 * | 6/2003 | Kirsch et al. ................. 709/246 |
| 2003/0187812 A1 * | 10/2003 | Theimer et al. ................. 707/1 |
| 2004/0193729 A1 * | 9/2004 | Saraph ........................ 709/241 |
| 2004/0255323 A1 * | 12/2004 | Varadarajan et al. .......... 725/25 |
| 2005/0015511 A1 * | 1/2005 | Izmailov et al. ............. 709/238 |
| 2005/0111387 A1 * | 5/2005 | Baccelli et al. ............. 370/256 |
| 2005/0152391 A1 * | 7/2005 | Effros et al. ................. 370/432 |

\* cited by examiner

*Primary Examiner*—Seema S Rao
*Assistant Examiner*—Christine Duong
(74) *Attorney, Agent, or Firm*—Lee & Hayes, PLLC

(57) ABSTRACT

An overlay network and scheme for building and using the overlay network are described. As the overlay network is built, new nodes joining the network are connected randomly with other nodes which results in a random graph as the network topology. The network is fully scalable, with each new node providing the same number of network connections for output to other nodes as it consumes when it joins the network. In addition, network coding is implemented at each node to mix packets of data entering each node using random linear functions. The network coding at each node generates new packets that are independent combinations of original data packets entering the node. The new coded packets make the distribution of data to other nodes more efficient and robust.

20 Claims, 12 Drawing Sheets

204 →

| | K1 | K2 | K3 | K4 | K5 | K6 | K7 | K8 |
|---|---|---|---|---|---|---|---|---|
| S | 1 | 1 | 1 | 1 | 1 | 1 | 1 | 1 |
| N1 | 0 | 0 | 1 | 1 | 1 | 1 | 0 | 0 |
| N2 | 1 | 1 | 1 | 1 | 0 | 0 | 0 | 0 |
| N3 | 0 | 0 | 0 | 0 | 1 | 1 | 1 | 1 |
| N4 | 1 | 1 | 1 | 0 | 0 | 0 | 0 | 0 |
| N5 | 0 | 0 | 0 | 1 | 1 | 0 | 0 | 0 |
| N6 | 0 | 0 | 0 | 0 | 0 | 1 | 1 | 1 |
| ⋮ | | | | | | | | |

Fig. 3

| 204 | K1 | K2 | K3 | K4 | K5 | K6 | K7 | K8 |
|---|---|---|---|---|---|---|---|---|
| S | 1 | 1 | 1 | 1 | 1 | 1 | 1 | 1 |
| N1 | 0 | 0 | 1 | 1 | 1 | 1 | 0 | 0 |

204 ⬋

| | K1 | K2 | K3 | K4 | K5 | K6 | K7 | K8 |
|---|---|---|---|---|---|---|---|---|
| S | 1 | 1 | 1 | 1 | 1 | 1 | 1 | 1 |
| N1 | 0 | 0 | 1 | 1 | 1 | 1 | 0 | 0 |
| N2 | 1 | 1 | 1 | 1 | 0 | 0 | 0 | 0 |
| N3 | 0 | 0 | 0 | 0 | 1 | 1 | 1 | 1 |

NEW NODE (E.G., N4)

FROM BLOCK 1314,
FIG. 13

1300

1316 Forward set of new packets to child node(s)

1318 Send a request to leave the network

1320 Leave the network by disconnecting from network input connections

Fig. 14

SCALABLE OVERLAY NETWORK

TECHNICAL FIELD

The present disclosure generally relates to digital content distribution, and more particularly to a scalable overlay network that has a random graph topology and implements network coding to enable large scale and robust content distribution.

BACKGROUND

In current network environments, scenarios often arise in which many network clients want to access particular digital content at the same time. For example, consider a server on the Internet that has content such as an exclusive news report showing digital video footage of a newly erupting volcano. Millions of clients may like to receive this content over the Internet within a short period of time, either by downloading the content or by streaming and playing the content in real time. These surges in network traffic are sometimes called "flash crowds", and they typically end up crashing the affected server. This is because the server has limited bandwidth that might be sufficient to service, for example, tens or maybe hundreds of nodes (i.e., clients), but not millions.

One solution to this problem is to form the server and clients into a peer-to-peer overlay network and to distribute the content using application layer multicast. In multicast, the server sends the content to a collection of nodes, each of which forwards the content to several other nodes, which in turn forward the content to several other nodes, and so on. A problem with peer-to-peer application layer multicast, however, is that the nodes are typically residential end-hosts. Residential end-hosts are unreliable compared to routers, and they do not have enough outgoing bandwidth to be able to forward the content to many other nodes. In addition, individual nodes have little incentive to forward the content to many other nodes. It is reasonable to assume, however, that each node has enough bandwidth and incentive to forward the content to one other node. This reduces the multicast distribution tree to a distribution "path", and could be an acceptable solution if the nodes were reliable. However, when there are a million nodes, for example, and the server is sending content directly to only one hundred nodes (the server's children), then there are nodes that are getting the content through approximately ten thousand hops. Therefore, even if there is a small probability that any particular node fails or leaves the system, the probability that any one of the upstream nodes fails is significant.

Prior work in this area suggests that a node should get data from a small number of other nodes rather than from just a single parent node, and that it should send data to an equal number (or approximately equal number) of child nodes. Thus, each node has approximately equal input and output bandwidths, and far shorter paths from the server are allowed. Data can include erasure codes (e.g., Reed-Solomon codes) or multiple description codes so that it is not necessary for a node to receive data successfully from all its parents.

In one solution, a node joining a network contacts a server to get the IP addresses of a set of nodes (e.g., 40 nodes) already receiving content. From the set of nodes already receiving content, the node joining the network selects a plurality of nodes (e.g., 5 nodes) to connect to. The nodes exchange information concerning downloads so that each node can determine which packets to generated and send. This solution improves the robustness over the previous solution, but reliability still degrades as the network gets larger if the number of connections between a node and its parent nodes stays fixed. Moreover the building and maintenance of the overlay network can become complex if routing structures need to be maintained.

Accordingly, a need exists for a scalable and robust network that maintains reliability both as the number of nodes in the network grows and as nodes leave the network.

SUMMARY

A server provides a number of bandwidth streams as network connection points for nodes joining an overlay network. For nodes that are joining the network, the server randomly selects which network connection points the nodes will connect to, creating a random graph topology for the overlay network. Each node joining the network consumes the network connections randomly selected by the server, and in turn, provides an equal number of network connections to which additional nodes may connect as the network expands. Thus, the number of bandwidth streams (i.e., network connections) available in the overlay network for additional nodes wanting to join the network remains constant as the network expands.

Each node within the overlay network is configured to implement network coding, enabling intermediate nodes to generate and transmit encoded blocks of data. Rather than merely forwarding original data packets received from a source server and/or parent node(s), intermediate nodes generate and transmit new packets that are independent combinations of the original data packets. Each new packet contains coefficients expressing the packet as a random linear combination of the original set of packets. Each new packet carries within it the coefficients needed to decode or recode the packet. Therefore, the new packets are decodable even if the network topology changes or if network components (e.g., the source server or parent nodes) fail or leave the network.

BRIEF DESCRIPTION OF THE DRAWINGS

The same reference numerals are used throughout the drawings to reference like components and features.

FIG. 3 illustrates an example of a network matrix being maintained on a server during the building of an overlay network.

FIGS. 13-14 are flow diagrams illustrating exemplary methods for building and using an overlay network.

DETAILED DESCRIPTION

Introduction

The following discussion is directed to an overlay network and a scheme for building and using the overlay network. As the overlay network is built, new nodes joining the network are connected randomly with other nodes which results in a random graph as the network topology. The network is fully scalable, with each new node providing the same number of network connections for output to other nodes as it consumes when it joins the network (i.e., from a server source and/or parent node(s)). In addition, network coding is implemented at each node to mix packets of data entering each node using random linear functions. The network coding at each node generates new packets that are independent combinations of original data packets entering the node. The new coded packets make the distribution of data to other nodes more efficient and robust.

Advantages of the described overlay network include good connectivity and expansion properties from the random graphs. For example, the impact of a node failure is localized and affects only the immediate children of the failed node. Furthermore, the probability that a working node loses connectivity from the server does not increase as the size of the network grows. In addition, the use of network coding in the described overlay network enables large scale file distribution that results in data throughput that approaches the optimum broadcast capacity.

Exemplary Environment

Figure 1:
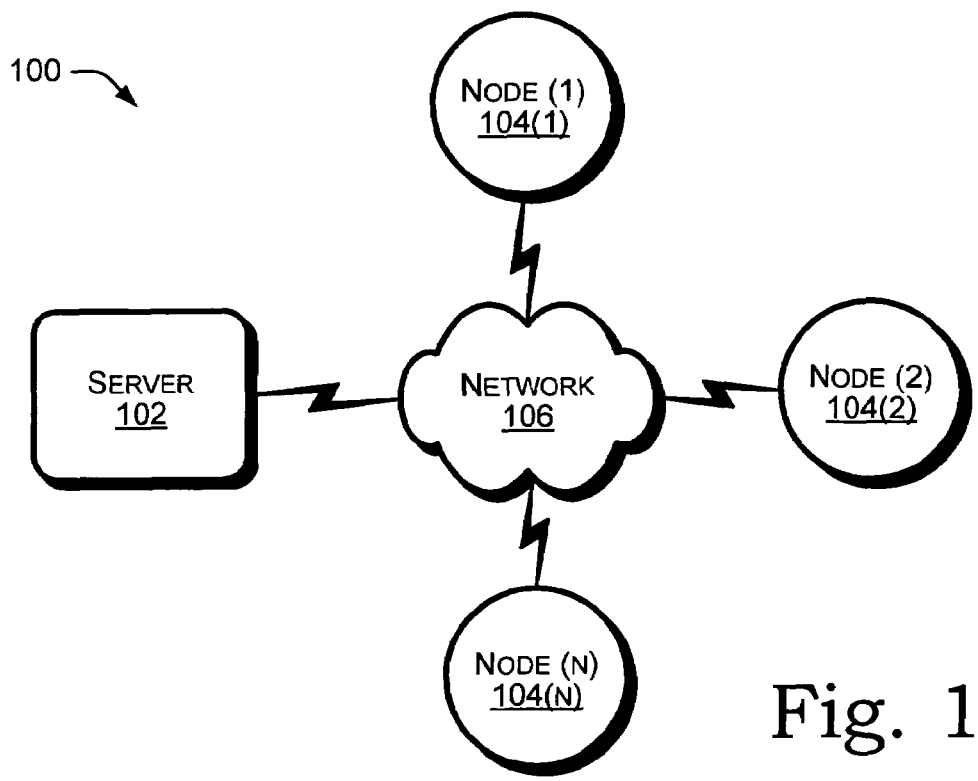
FIG. 1 illustrates an exemplary environment suitable for building and using an overlay network.

FIG. 1 illustrates an exemplary environment 100 suitable for building and using an overlay network according to embodiments such as those discussed below. In one implementation, the environment 100 of FIG. 1 represents the Internet, including routers, links between routers, and end hosts. Internet nodes include routers and end hosts that are linked together by actual physical connections. By contrast to such a physical network, an overlay network is a logical network that operates on top of a physical network such as the Internet. Thus, although not illustrated in FIG. 1, an overlay network would include links or edges between the server 102 and nodes 104 that travel through the underlying physical network. For example, a direct logical connection in an overlay network may actually travel through many different physical nodes in the underlying physical network.

In the exemplary environment 100 of FIG. 1, network 106 is intended to represent any of a variety of conventional network topologies and types (including optical, wired and/or wireless networks), employing any of a variety of conventional network protocols (including public and/or proprietary protocols). Network 106 may include, for example, a home network, a corporate network, or the Internet, as well as possibly at least portions of one or more local area networks (LANs) and/or wide area networks (WANs).

A server device 102 generally acts as a source to provide access to stored media content, such as media files, and/or live media content, such as a live cable TV feed or Webcast. Thus, server 102 transfers media content either by downloading the content to various nodes 104 or by streaming the content in real time to nodes 104 upon request. Server 102 can make any of a variety of data available for download and/or streaming to client nodes 104, including content such as audio, video, text, images, animation, and the like. The term "streaming" is used to indicate that the data representing the media content is provided over a network 106 to a client node 104 and that playback of the content can begin prior to the content being delivered in its entirety. The data may be publicly available or alternatively restricted (e.g., restricted to only certain users, available only if the appropriate fee is paid, restricted to users having access to a particular network, etc.). Additionally, the data may be "on-demand" (e.g., pre-recorded, stored content of a known size) or alternatively from a live "broadcast" (e.g., having no known size, such as a digital representation of a concert being captured as the concert is performed and made available for streaming shortly after capture). Nodes 104 are client devices that generally receive content from server 102 and/or from other nodes 104 and play it back for a user. Requests from client nodes 104 for media content available on server 102 are routed from the nodes 104 to the server 102 via network 106. The server 102 receives requests and returns requested content to the requesting nodes 104 via network 106.

Server 102 may be implemented as any of a variety of conventional computing devices, including, for example, a desktop PC, a notebook or portable computer, a workstation, a mainframe computer, an Internet appliance, combinations thereof, and so on, that are configurable to transfer and/or stream stored and/or live media content to a client node 104.

Client nodes 104 may also be implemented as any of a variety of conventional computing devices, including, for example, a desktop PC, a notebook or portable computer, a workstation, a mainframe computer, an Internet appliance, a gaming console, a handheld PC, a cellular telephone or other wireless communications device, a personal digital assistant (PDA), a set-top box, combinations thereof, and so on. An exemplary computing environment for implementing a server 102 and a client node 104 is described in more detail herein below with reference to FIG. 15.

Exemplary Embodiments

Figure 2:
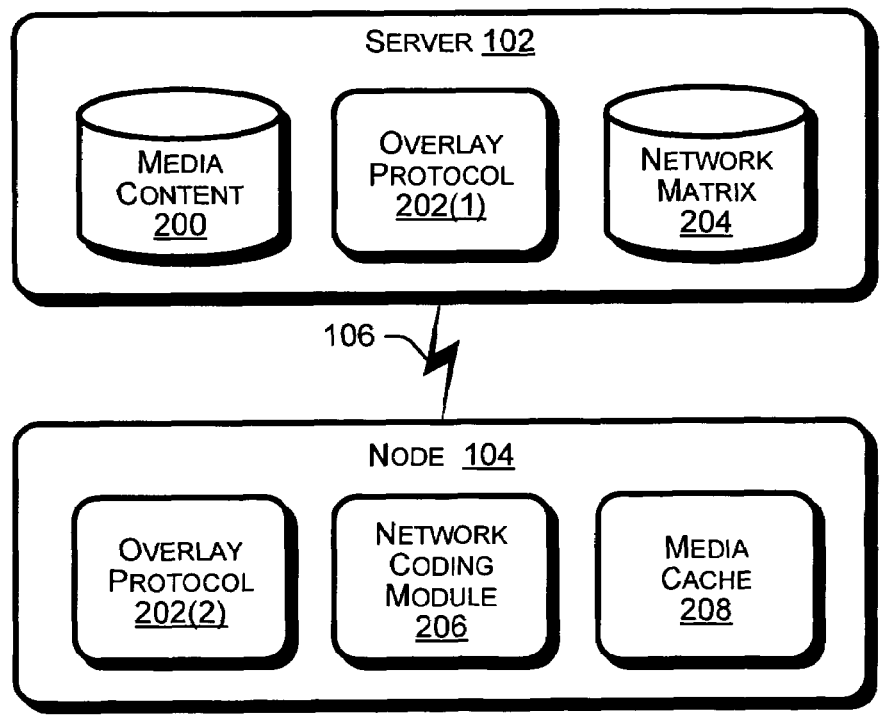
FIG. 2 illustrates an exemplary embodiment of a server and client node suitable for building and using an overlay network.

FIG. 2 illustrates an exemplary embodiment of a server 102 and client node 104 suitable for building and using an overlay network as discussed below. Server 102 includes and/or has access to media content 200 intended for distribution to a client node 104. Server 102 also includes an overlay protocol 202(1) configured to manage the building of an overlay network (e.g., a peer-to-peer network) that includes a plurality of client nodes 104. Server 102 also includes network matrix 204. Network matrix 204 is a data structure constructed by overlay protocol 202(1) during the building of an overlay network. As discussed in greater detail herein below, network matrix 204 generally mirrors the structure of the resulting overlay network that is built and managed by overlay protocol 202(1). Although the network matrix 204 is illustrated and discussed herein as being maintained on server 102, it is noted that network matrix 204 might also be maintained by some other centralized authority.

Each client node 104 includes overlay protocol 202(2) which operates in association with overlay protocol 202(1) on server 102 to manage the building of an overlay network. Client node 104 also includes network coding module 206 configured to implement network coding with respect to data packets entering the node 104 as discussed in greater detail below. Client node 104 also includes a media cache 208 configured to store media content received from server 102 and/or other parent client nodes 104.

Building an Overlay Network

FIGS. 3-10 illustrate an exemplary process of building and managing an overlay network where the network connections to client nodes 104 joining the network are selected randomly, and where the number of network connections remains constant as the network grows or shrinks.

As noted above, server 102 includes a network matrix 204 which is a data structure constructed and maintained on server 102 by overlay protocol 202(1) during the building of an overlay network. The network matrix 204 mirrors the structure of the overlay network as the network is being built.

Figure 4:
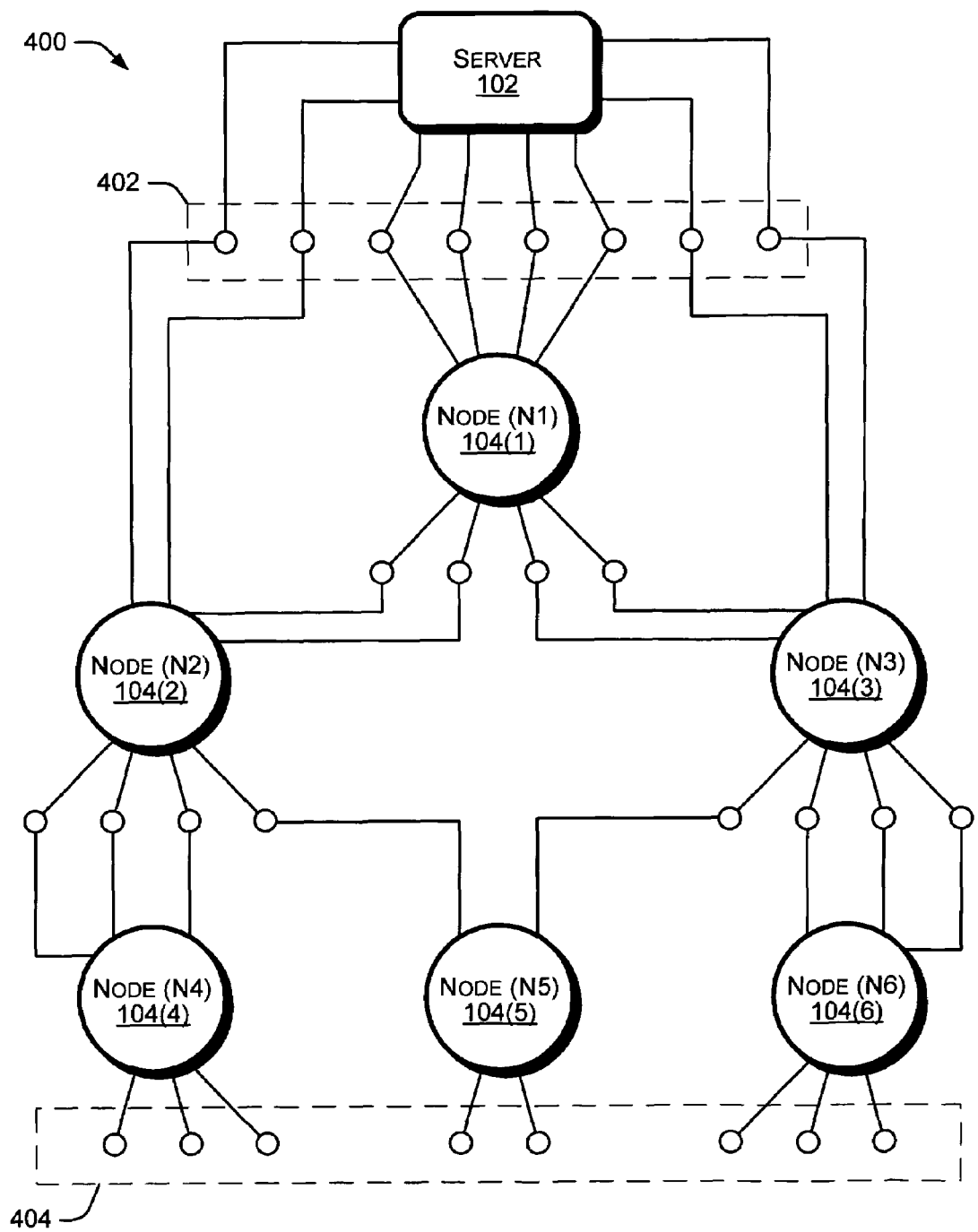
FIG. 4 illustrates an example of an overlay network that corresponds to the network matrix in FIG. 3.

FIG. 3 illustrates an example of a network matrix 204 being maintained on server 102 by overlay protocol 202(1) during the building of an overlay network. FIG. 4 illustrates an example of an overlay network 400 that corresponds to matrix 204. Referring to FIGS. 3 and 4, matrix 204 is an N×K data structure where N is the number of users (client nodes 104) currently in the overlay network 400, and K is the number of bandwidth streams or network connection points 402 available from the server 102 to which nodes joining the overlay network 400 can connect. Because each node joining the overlay network 400 provides the same number of network connections that it consumes upon joining the network, there are always K number of network connection points available in the overlay network 400, even after the initial K network connections 402 provided by the server 102 are consumed. This is apparent, for example, from the 8 available network connections 404 being provided by the nodes N4, N5 and N6 (104(4), 104(5), 104(6)) as shown in FIG. 4.

In the matrix 204, each row "N" of the matrix corresponds to a node 104 and each column "K" corresponds to a network connection (i.e., a stream of unit bandwidth). Thus, in the example matrix 204 of FIG. 3, which corresponds to the overlay network 400 of FIG. 4, there are 6 nodes 104 (i.e., nodes N1-N6) currently joined in the overlay network 400 and 8 available network connections 404 (i.e., K1-K8) to which new nodes can connect. Note that the 8 available network connections 404 are provided by nodes N4, N5, and N6 (104(4), 104(5), 104(6)), rather than by server 102. Because each new node joining the network provides the same number of network connections as it consumes, the number of network connections available for new nodes joining the overlay network remains constant.

Each row of the matrix 204 has d ones and k-d zeroes, where each of the ones represents a network connection point (i.e., a stream of unit bandwidth) to which a new node 104 can connect. Note however, that the row labeled "S" (for "server") has k ones, which is intended to illustrate that the server 102 provides the initial k network connection points for the overlay network. The d ones in each row represent the network connections consumed by the node N corresponding to the row. In addition, the d ones in each row represent network connections created by the node N corresponding to the row to which other nodes may connect. Although d is typically the same value for each node, this is not necessarily always the case, as is apparent in FIGS. 3 and 4. That is, although nodes N1, N2, and N3 have each consumed and then provided 4 network connections, nodes N4, N5, and N6 have consumed and then provided 3, 2, and 3 network connections, respectively.

When a new node 104 joins the overlay network 400, the server 102 creates a new row at the end of the matrix 204 with d ones and k–d zeroes, selecting the locations of the d ones at random. When a node 104 leaves gracefully, the server 102 deletes the corresponding row from the matrix 204. As the overlay network grows, the matrix 204 captures the network topology. The row "S" at the top of the matrix corresponds to the server 102, and consists of k ones. In general, there is an edge in the overlay network from node i to node j if row i appears before row j in the matrix 204, and if there is a column containing a one in row i, a one in row j, and zeroes in any intervening rows. Whenever there is an edge from node i to node j, it is said that i is a parent of j and j is a child of i. Thus, referring to matrix 204 of FIG. 3, there are edges in the network from node N1 to nodes N2 and N3, and node N1 is therefore a parent of nodes N2 and N3.

The parentage of node N1 to nodes N2 and N3 becomes more apparent with reference to the corresponding overlay network 400 of FIG. 4, where it is clear that node N1 is a parent to nodes N2 and N3. In addition, the server 102 is also a parent to nodes N1, N2, and N3. This too is apparent from the matrix 204 of FIG. 3, where there are network edges from each of nodes N1, N2, and N3 to the server "S" 102.

The bandwidth of each node 104 in the overlay network 400 is divided into d equal "units" of bandwidth. In terms of this unit of bandwidth, the server 102 bandwidth is denoted by k. Each node is allowed to join the overlay network 400 at any time and to leave the network at any time. When joining the network the node is asked to follow a hello protocol, and when leaving the network the node is asked to follow a good-bye protocol. When a node leaves the network using the good-bye protocol, the leave is called a graceful leave. If a node leaves otherwise (e.g., due to a system crash or killed application), the leave is considered a non-ergodic failure. A failure can also be due to a temporary, unannounced outage such as packet loss, network congestion, or other processes using the communication link. Such a temporary outage is called an ergodic failure. When failures occur, communication suffers. (For synchronous communication the bandwidth decreases, while for asynchronous communication the download time increases.) For non-ergodic failures, the server 102 and other affected nodes 104 engage in repairs to perform the steps that the leaving node was supposed to perform in the good-bye protocol.

When a new node wishes to join the overlay network, its overlay protocol 202(2) is configured to contact the server 102 and request to join the network. The overlay protocol 202(1) on server 102 generates a new row in the matrix 204, randomly assigning network connections K1-K8 to the new node as necessary, and asks the indicated parent nodes 104 to begin sending data streams to the new node. When an old or existing node wishes to leave the network, the node again contacts the server 102. The server 102 asks the old node's parents to redirect their data streams to the old node's children, and then deletes the old node's row in the matrix 204. When a node fails (non-ergodically), the children of the failed node eventually complain to the server 102. The server 102 then asks the failed node's parents to redirect their data streams to the failed node's children, and deletes the failed node's row.

Figures 5, 6:
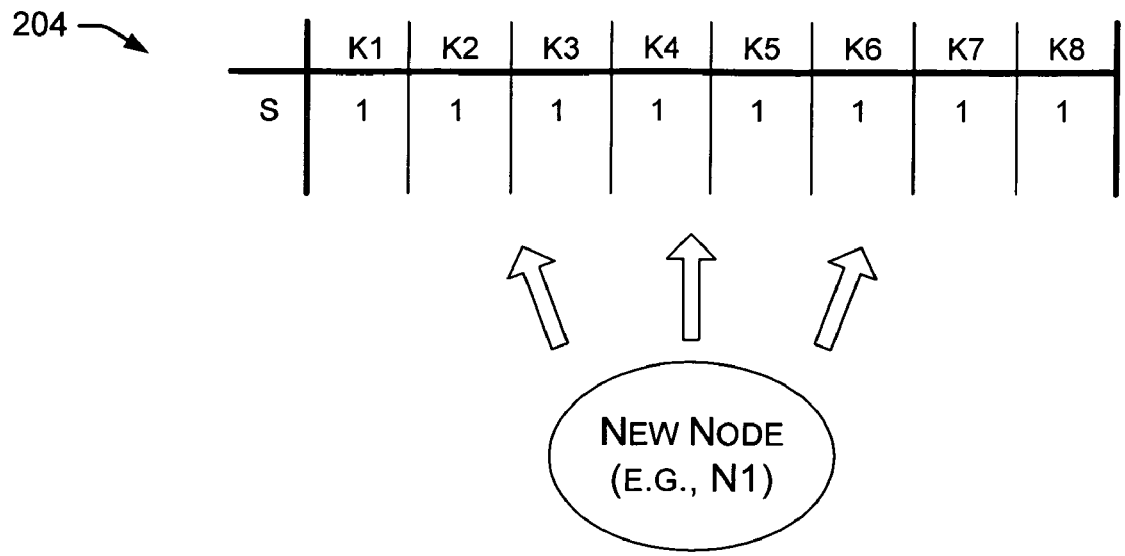
FIG. 5 illustrates a network matrix prior to any nodes joining the overlay network.
FIG. 6 illustrates the network matrix of FIG. 5 after the server has randomly assigned network connections to a new node joining the overlay network.

The process of building an overlay network 400 and the matrix 204 corresponding to the network is further illustrated with respect to FIGS. 5-10. As in FIGS. 3-4 above, a simple example is used in which the server 102 has 8 network connections, K1-K8 (indicated by the 8 "ones" in row "S" of FIG. 5). In FIG. 5, matrix 204 is shown prior to any nodes 104 having joined the overlay network 400. A new node 104 (e.g., node N1) making a request to join the network effectively sees the possibility of joining the network by connecting to the available K1-K8 network connections (i.e., the "ones") provided by the server 102. The server 102 randomly assigns network connections to the new node and the node is joined to the network and added to the bottom of the matrix 204 as shown in FIG. 6. A random assignment of network connections means that the new node N1 may be connected randomly to the network through any of the available network connections, K1-K8.

Figures 7, 8:
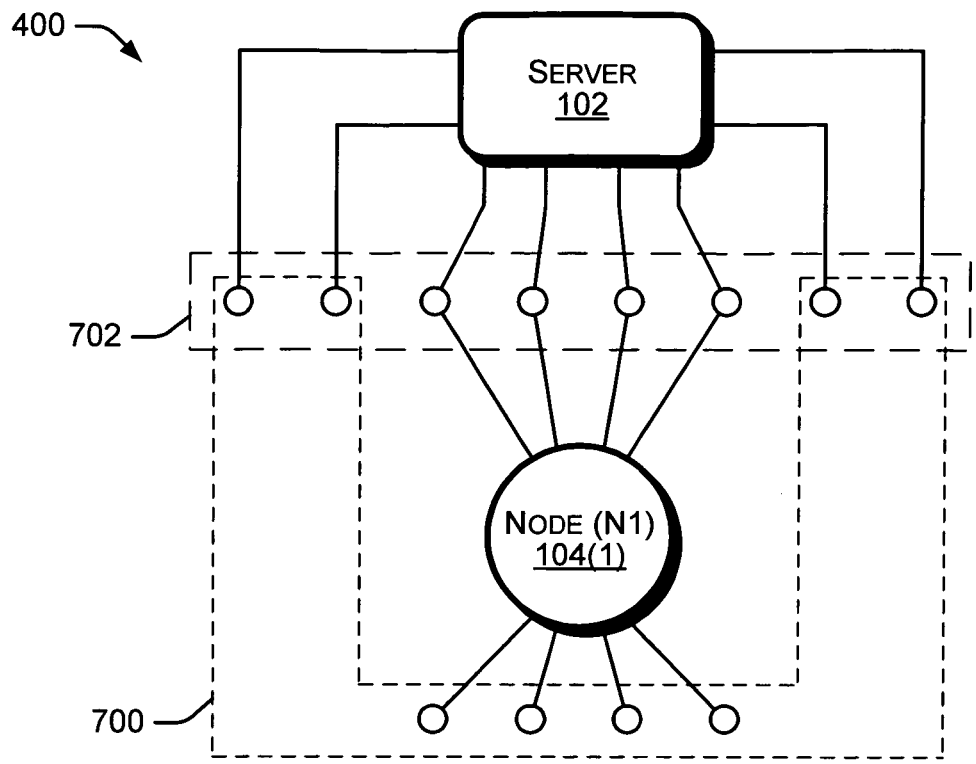
FIG. 7 illustrates an overlay network that corresponds to the network matrix of FIG. 6 after a new node has joined the network.
FIG. 8 illustrates the network matrix of FIG. 6 prior to another new node joining the overlay network.

FIG. 7 illustrates the overlay network 400 that corresponds to the matrix 204 of FIG. 6 after node N1 104(1) has joined the network. Referring to FIG. 8, another new node (e.g., node N2) making a request to join the overlay network 400 effectively sees the possibility of joining the network by connecting to the available network connections (i.e., the "ones") being presented by the network. In this case, the available network connections are provided by both the server 102 and node N1 104(1) which previously joined the network. This is illustrated in the matrix 204 of FIG. 8 by the new node's view of the available "ones" from the bottom of the matrix 204, either directly, or through zeroes located in one or more intervening rows. From the bottom of the matrix 240 in FIG. 8, a new node (e.g., node N2) sees 4 available network connections or "ones" at K1, K2, K7, and K8. These 4 ones are seen through the zeroes in the intervening N1 row of the matrix 204. The new node also sees 4 available network connections or "ones" at K3, K4, K5, and K6, provided by node N1 104(1) which previously joined the network. In FIG. 7, this is illustrated by the available network connections outlined in box 700. FIG. 7 also illustrates the original network connections outlined in box 702 that were available from server 102 prior to the first node N1 104(1) joining the network.

Figure 9:
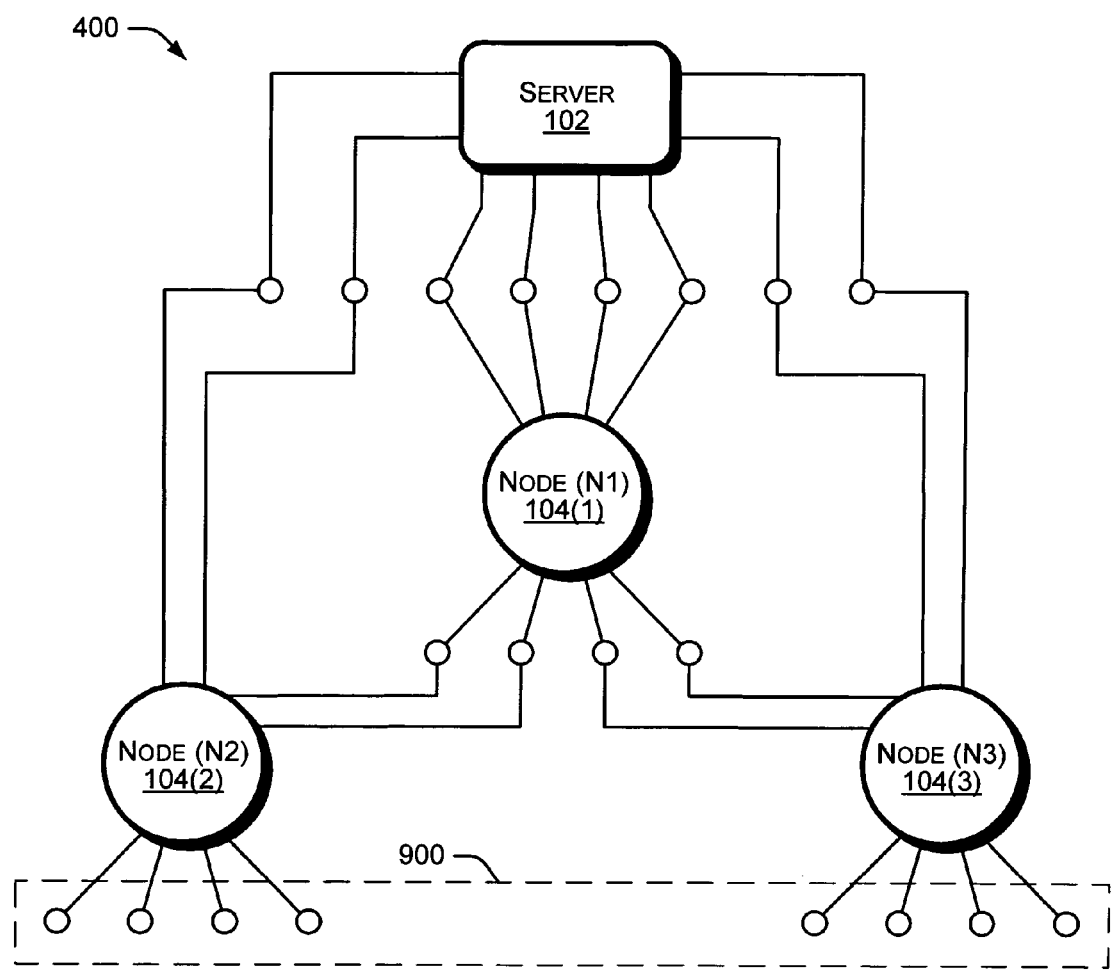
FIG. 9 illustrates the overlay network after two new nodes have joined the network.

FIG. 9 illustrates the overlay network 400 after nodes N2 104(2) and N3 104(3) have joined. Server 102 has randomly assigned available network connections K1-K8 to nodes N2 and N3. Upon joining the network 400 and consuming the randomly assigned network connections, the new nodes N2 and N3 have each provided the same number of additional network connections that they consumed when joining the network. Thus, the number of available network connections, designated as K1-K8 in matrix 204, remains constant as the network grows. The network connections made available by nodes N2 and N3 are outlined in box 900 of FIG. 9.

Figure 10:
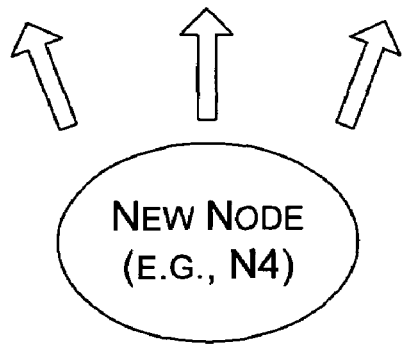
FIG. 10 illustrates the network matrix after two new nodes have joined the network.

FIG. 10 illustrates the state of the matrix 204 being managed by the overlay protocol 202(1) on server 102 after nodes N2 104(2) and N3 104(3) have joined the overlay network 400. In a manner similar to that discussed above, a new node (e.g., node N4) wanting to join the network 400 effectively sees the available network connections K1-K8 through its view from the bottom of matrix 204. Here, a new node sees the K1-K8 connections as "ones" available from node N3 at row N3 and as "ones" available from node N2 at row N2 through the intermediate zeroes of row N3. The overlay protocol 202(1) on server 102 randomly assigns network connections to the new node and the node uses the assigned connections to join the overlay network 400.

FIGS. 3 and 4, already discussed above, illustrate the progression of the overlay network 400 when nodes N4, N5, and N6 join the network.

The above discussion was simplified by the assumption that the number of available network connections remains constant as the network grows or shrinks. However, it should be appreciated that in general it is possible for the number of available network connections to change slightly as the network grows or shrinks. For example, if each new node offers one more output connection than the number of input connections that it consumes, then the number of available network connections will grow as the network grows. This may be useful for some applications.

The above discussion was also simplified by the assumption that each network connection carries one unit of bandwidth. However, it should be appreciated that each such network connection is logical. Multiple such network connections may be grouped together into a single physical network connection, such as a TCP/IP connection. Thus, one TCP/IP or other physical network connection between two nodes may carry any number of units of bandwidth.

It should be appreciated that the random assignment of network connections may be done in conjunction with other information, such as proximity, locality, or other neighborhood information. The random assignment need not be uniformly distributed across all available connections.

Network Coding in the Overlay Network

Each client node 104 within the overlay network is configured to implement network coding. Network coding enables nodes to generate and transmit encoded blocks of data. The encoded blocks of data are new data packets that are independent combinations of original data packets that a node receives from the server 102 and/or parent nodes. When a parent or source node needs to send a packet to another node (i.e., a child node), the parent or source node generates and sends a random linear combination of all the information available to it (similar to XORing multiple packets). After the child node receives enough random linear combinations of the new packets, the child node can reconstruct the original information. In general, with network coding, a given packet is combined with many other packets as it propagates through the network, which drastically reduces the probability of a packet not being useful to a given node.

Figure 11:
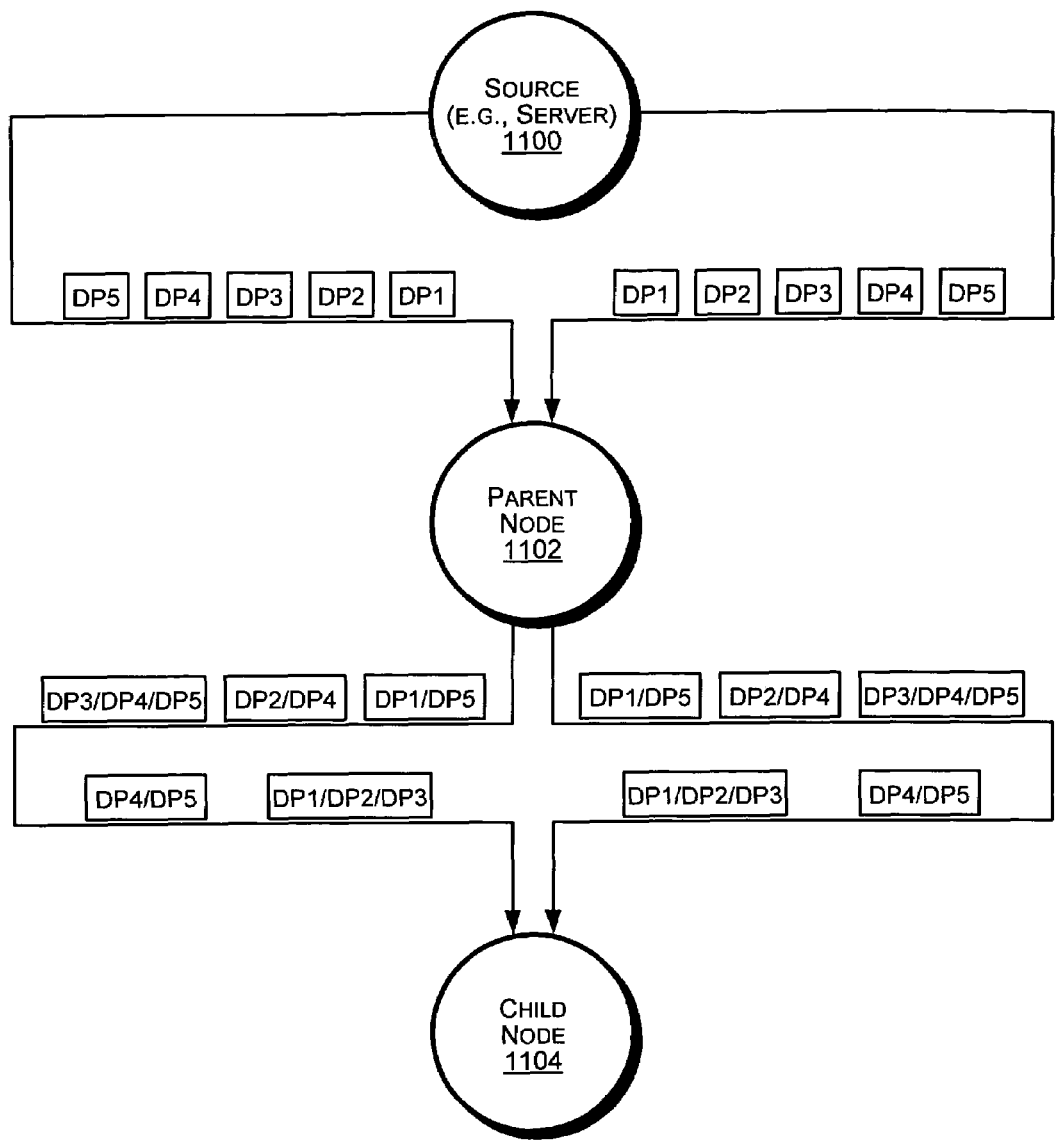
FIG. 11 illustrates an example of network coding being implemented by client nodes in an overlay network.

FIG. 11 illustrates an example of network coding being implemented by client nodes in an overlay network. A source device 1100 (e.g., a server) sends original information as individual data packets DP1-DP5 to client nodes such as parent node 1102 through one or more network connections. Instead of forwarding the original information to other nodes (e.g., child node 1104) in the form of individual data packets DP1-DP5, parent node 1102 encodes the original packets as random linear combinations of all the original information and sends the encoded packets. As shown in FIG. 11, the child node 1104 receives random linear combinations of packets (e.g., combination packet DP1/DP2/DP3, etc.). When the child node 1104 receives enough random linear combinations of packets, it can reconstruct the original information by decoding the encoded packets.

Each new encoded packet from the parent node 1102 contains coefficients expressing the packet as a random linear combination of the original set of packets at the parent node. Each new packet carries within it the coefficients needed to decode or recode the packet. Therefore, the new packets are decodable even if the network topology changes or if network components (e.g., the source server or parent nodes) fail or leave the network.

Figure 12:
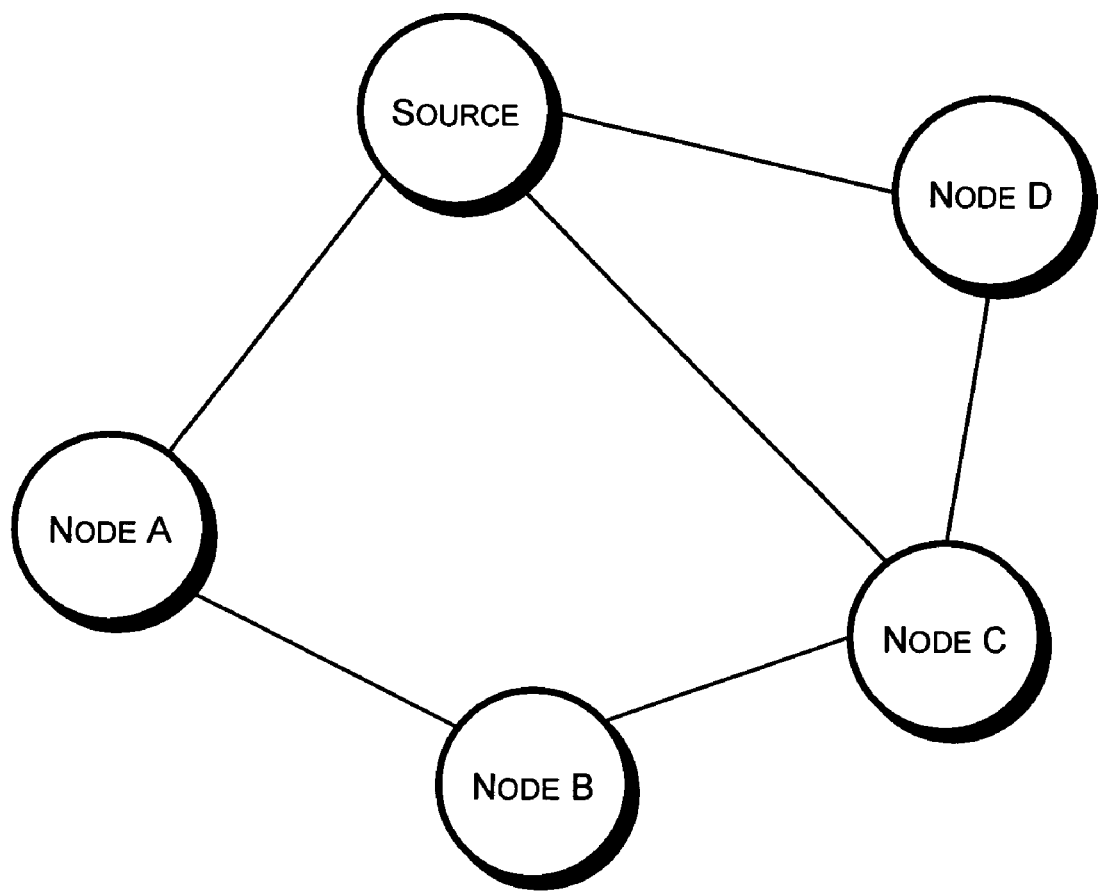
FIG. 12 illustrates an example of a network implementing network.

The network coding process introduces randomization that eases the scheduling of block propagation through the overlay network, which in turn, makes the distribution more efficient. Easing the scheduling of block propagation is important in large overlay networks, where nodes need to make block forwarding decisions based only on local information. As an example, assume that nodes A, B, and C are linked together in a network along with a source as illustrated in FIG. 12. Assume that node A has received packets 1 and 2 from the source. If network coding is not used, node B can download either packet 1 or packet 2 from node A with the same probability. At the same time that node B downloads a packet from node A, node C independently downloads packet 1 from the source. If node B decides to retrieve packet 1 from node A, then both nodes B and C will have the same packet 1, and the link between them cannot be used.

However, if network coding is used, node B will download a linear combination of packets 1 and 2 from node A, which in turn can be used with node C. Clearly, node B could have downloaded packet 2 from node A and then used the link with C efficiently. However, without any knowledge of the transfers in the rest of the network (which is difficult to achieve in a large, complex, and distributed environment), node B cannot determine which is the right packet to download. On the other hand, such a task becomes trivial using network coding. It is important to note that with network coding, the decision on which packets to generate and send does not require extra information about the downloads in the rest of the network. Therefore, the content distribution effort is greatly simplified.

The Appendix section of this disclosure provides a detailed theoretical analysis to prove near optimal bounds on the parameters defining the robustness and scalability of an overlay network implementing network coding.

Exemplary Methods

Figure 13:
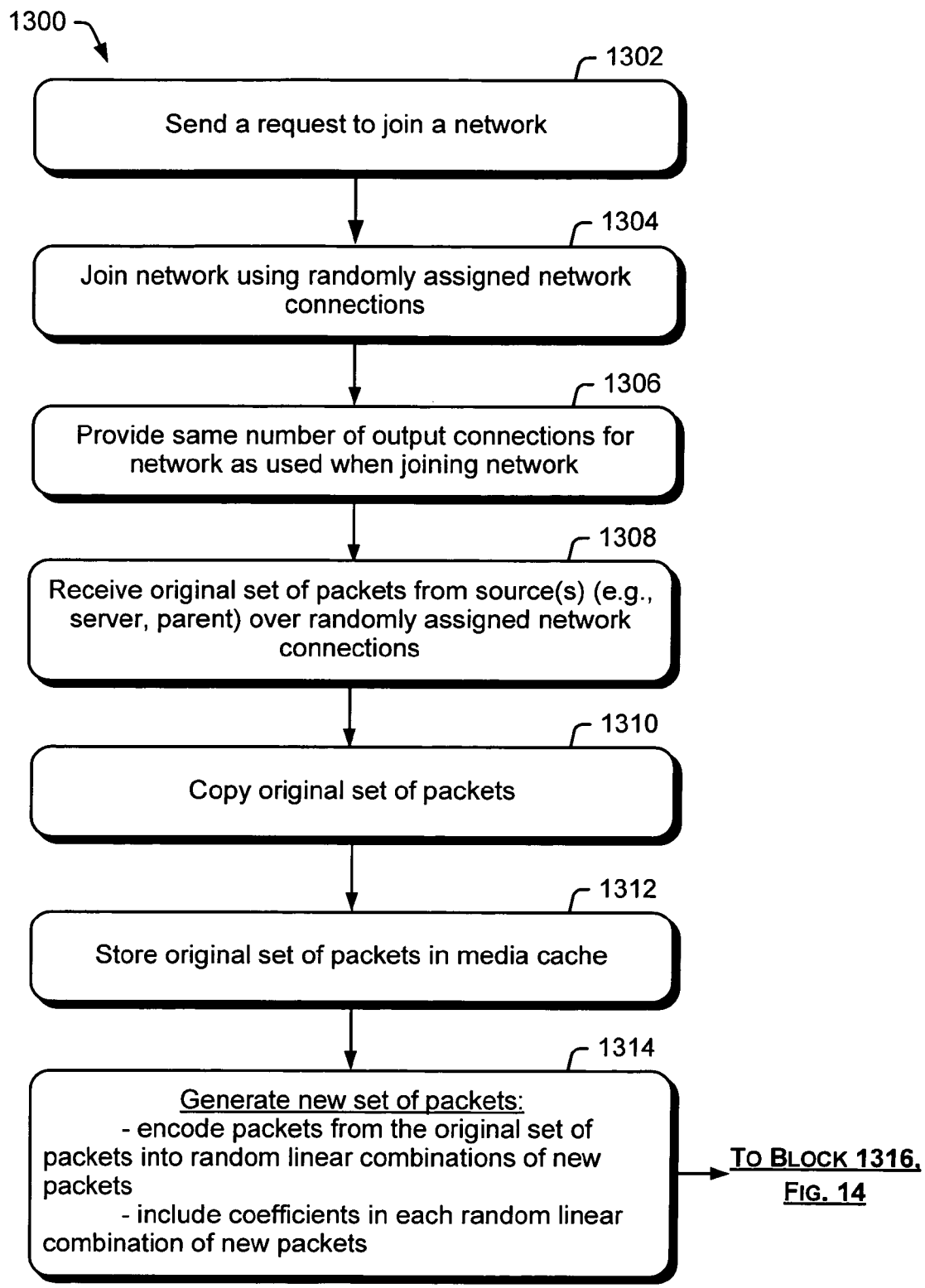

Example methods for building and using an overlay network will now be described with primary reference to the flow diagrams of FIGS. 13 and 14. The methods apply to the exemplary embodiments discussed above with respect to FIGS. 1-12. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, or device. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 1302 of method 1300, a new client node 104 sends a request to join a network. The client node sends the request to a server 102 using an overlay protocol 202(2) that communicates with a counterpart overlay protocol 202(1) on the server 102. At block 1304, the client node 104 joins the overlay network by connecting to network connections available in the network (e.g., from server 102 and/or other parent nodes 104). The network connections are randomly assigned by the server 102 for use by the new client node 104. At block 1306, the new client node provides the same number of output network connections for use by the network as it used as input connections when it joined the network.

At block 1308 of method 1300, the client node receives an original set of packets from a source (e.g., from server 102 and/or other parent nodes 104) over the randomly assigned network connections. At block 1310, the client node copies the original set of packets and stores the original set of packets (e.g., for playback) in a media cache as shown at block 1312. At block 1314, the client node implements network coding to generate a new set of packets. Packets from the original set of packets are encoded into random linear combinations of new packets: Each new encoded packet includes coefficients expressing the packet as a random linear combination of the original set of packets at the parent node that can be used to decode or recode the packet. The new packets are decodable even if the network topology changes or if network components (e.g., the source server or parent nodes) fail or leave the network.

The method 1300 continues on FIG. 14 with block 1316. At block 1316, the client node forwards the set of new packets to one or more child nodes. At block 1318, the client node sends a request to leave the network, and at block 1320, the client node leaves the network by disconnecting from the network input connections.

Exemplary Computing Environment

Figure 15:
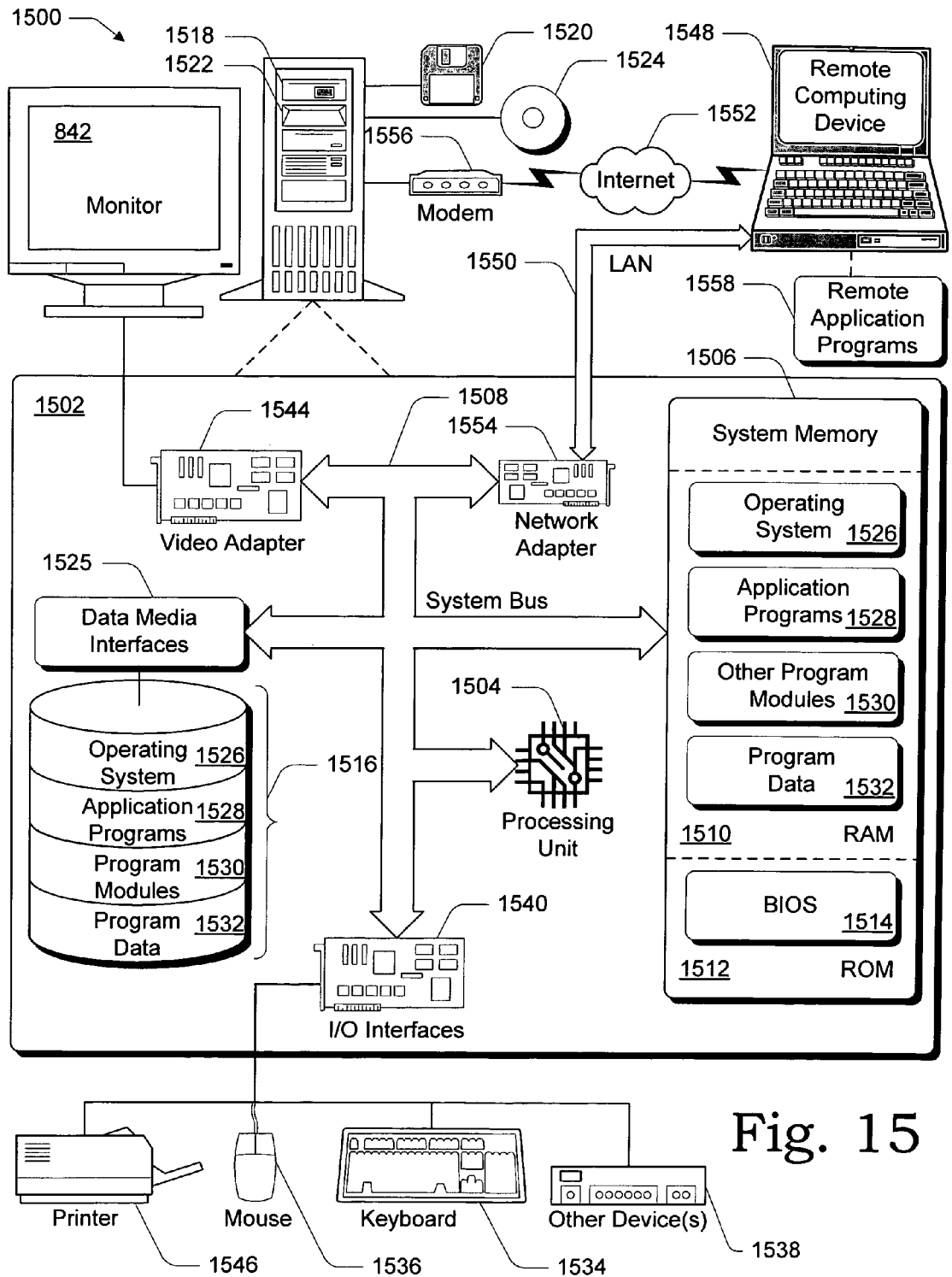
FIG. 15 illustrates an exemplary computing environment suitable for implementing a server device and client node such as those discussed with reference to FIGS. 1-14.

FIG. 15 illustrates an exemplary computing environment suitable for implementing computer devices such as a server device 102 and a client node 104 as discussed above with reference to FIGS. 1-14. Although one specific configuration is shown in FIG. 15, such computing devices may be implemented in other computing configurations.

The computing environment 1500 includes a general-purpose computing system in the form of a computer 1502. The components of computer 1502 may include, but are not limited to, one or more processors or processing units 1504, a system memory 1506, and a system bus 1508 that couples various system components including the processor 1504 to the system memory 1506.

The system bus 1508 represents one or more of any of several types of bus structures, including a memory bus or memory controller, a peripheral bus, an accelerated graphics port, and a processor or local bus using any of a variety of bus architectures. An example of a system bus 1508 would be a Peripheral Component Interconnects (PCI) bus, also known as a Mezzanine bus.

Computer 1502 includes a variety of computer-readable media. Such media can be any available media that is accessible by computer 1502 and includes both volatile and non-volatile media, removable and non-removable media. The system memory 1506 includes computer readable media in the form of volatile memory, such as random access memory (RAM) 1510, and/or non-volatile memory, such as read only memory (ROM) 1512. A basic input/output system (BIOS) 1514, containing the basic routines that help to transfer information between elements within computer 1502, such as during start-up, is stored in ROM 1512. RAM 1510 contains data and/or program modules that are immediately accessible to and/or presently operated on by the processing unit 1504.

Computer 1502 may also include other removable/non-removable, volatile/non-volatile computer storage media. By way of example, FIG. 15 illustrates a hard disk drive 1516 for reading from and writing to a non-removable, non-volatile magnetic media (not shown), a magnetic disk drive 1518 for reading from and writing to a removable, non-volatile magnetic disk 1520 (e.g., a "floppy disk"), and an optical disk drive 1522 for reading from and/or writing to a removable, non-volatile optical disk 1524 such as a CD-ROM, DVD-ROM, or other optical media. The hard disk drive 1516, magnetic disk drive 1518, and optical disk drive 1522 are each connected to the system bus 1508 by one or more data media interfaces 1525. Alternatively, the hard disk drive 1516, magnetic disk drive 1518, and optical disk drive 1522 may be connected to the system bus 1508 by a SCSI interface (not shown).

The disk drives and their associated computer-readable media provide non-volatile storage of computer readable instructions, data structures, program modules, and other data for computer 1502. Although the example illustrates a hard disk 1516, a removable magnetic disk 1520, and a removable optical disk 1524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like, can also be utilized to implement the exemplary computing system and environment.

Any number of program modules can be stored on the hard disk 1516, magnetic disk 1520, optical disk 1524, ROM 1512, and/or RAM 1510, including by way of example, an operating system 1526, one or more application programs 1528, other program modules 1530, and program data 1532. Each of such operating system 1526, one or more application programs 1528, other program modules 1530, and program data 1532 (or some combination thereof) may include an embodiment of a caching scheme for user network access information.

Computer 1502 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1502 via input devices such as a keyboard 1534 and a pointing device 1536 (e.g., a "mouse"). Other input devices 1538 (not shown specifically) may include a microphone, joystick, game pad, satellite dish, serial port, scanner, and/or the like. These and other input devices are connected to the processing unit 1504 via input/output interfaces 1540 that are coupled to the system bus 1508, but may be connected by other interface and bus structures, such as a parallel port, game port, or a universal serial bus (USB).

A monitor 1542 or other type of display device may also be connected to the system bus 1508 via an interface, such as a video adapter 1544. In addition to the monitor 1542, other output peripheral devices may include components such as speakers (not shown) and a printer 1546 which can be connected to computer 1502 via the input/output interfaces 1540.

Computer 1502 may operate in a networked environment using logical connections to one or more remote computers, such as a remote computing device 1548. By way of example, the remote computing device 1548 can be a personal computer, portable computer, a server, a router, a network computer, a peer device or other common network node, and the like. The remote computing device 1548 is illustrated as a portable computer that may include many or all of the elements and features described herein relative to computer system 1502.

Logical connections between computer 1502 and the remote computer 1548 are depicted as a local area network (LAN) 1550 and a general wide area network (WAN) 1552. Such networking environments are commonplace in offices, enterprise-wide computer networks, intranets, and the Internet. When implemented in a LAN networking environment, the computer 1502 is connected to a local network 1550 via a network interface or adapter 1554. When implemented in a WAN networking environment, the computer 1502 includes a modem 1556 or other means for establishing communications over the wide network 1552. The modem 1556, which can be internal or external to computer 1502, can be connected to the system bus 1508 via the input/output interfaces 1540 or other appropriate mechanisms. It is to be appreciated that the illustrated network connections are exemplary and that other means of establishing communication link(s) between the computers 1502 and 1548 can be employed.

In a networked environment, such as that illustrated with computing environment 1500, program modules depicted relative to the computer 1502, or portions thereof, may be stored in a remote memory storage device. By way of example, remote application programs 1558 reside on a memory device of remote computer 1548. For purposes of illustration, application programs and other executable program components, such as the operating system, are illustrated herein as discrete blocks, although it is recognized that such programs and components reside at various times in different storage components of the computer system 1502, and are executed by the data processor(s) of the computer.

Appendix

This Appendix provides a theoretical analysis to prove near optimal bounds on the parameters defining the robustness and scalability of an overlay network implementing network coding.

Recall our notation from the previous sections. Let k be the number of network connections or "threads" hanging from the server, and d be the number of incoming and outgoing threads for each user node, where $d \geq 2$. Assume $k \geq cd^2$, for some large enough constant c. Let p be the probability that a user fails in the repair interval. Assume $pd \leq \delta$, for some small enough constant $\delta$. Failure is different from a graceful leave. When a user node leaves gracefully the corresponding row from the matrix M is removed. This means the probability distribution of M, over all possible matrices of the same size, is the same as if the user had not had even joined the network. This provides the following lemma.

Lemma 1: When a node leaves gracefully then the probability distribution of the network over all possible networks is the same as if the node had not had even joined the network.

When a node fails, then after the repair, its corresponding row from M is removed by the server. So the failures that have been taken care of satisfy the above lemma too. The properties of M can thus be estimated by building it sequentially. For the proof, M is built up top down. Initially M has one row corresponding to server. An addition of a row in M will be called a step or a unit of time. Note that M contains the complete information about the network except for the failures. An additional tag is put on each row of M, denoting whether the corresponding node is a failed node or a working node. So, M together with the tag represents the complete information about the network, which is considered a directed acyclic graph on the working nodes.

Consider a node. According to the network coding theorem [1], it can receive the broadcast at the rate equal to its edge connectivity from the server. The connectivity should ideally be d. Its connectivity from the server will be affected by the failures of its immediate predecessors. The probability of failure of one of its immediate predecessors is at most dp. There is a possibility that its connectivity is affected by the failures of other nodes too. This adds negligible probability to dp. Formally, it is shown that the probability that its connectivity will be affected is $(1+\epsilon)dp$. So in essence a node essentially feels only the effect of the failures of its immediate predecessors and is not affected by the failures of other nodes in the network.

At any point in the network there are k threads hanging. A new node picks d of them at random. Conceptually we interchange the time ordering of two events: a node joining the network and it failing (or not). Instead it is assumed that the node tosses a coin before joining and thereby joins the network as a failed node with probability p and as a working node with probability 1−p. When it joins it picks randomly a set of d hanging threads.

Let $N^t$ denote the network after t nodes have joined (including the information on which of these are failed nodes). Let $B_j^t$ be the number of d-tuples of hanging threads that have edge-connectivity d−j from the server (i.e., if a new node picks this d-tuple then its edge-connectivity from the server will be d−j).

Clearly $$\sum_{j=0}^{d} B_j^t = A = \binom{k}{d}$$

is the total number of d tuples of hanging threads. We are interested in the number of "total defects" measured by $B^t = 1 \cdot B_1 + 2 \cdot B_2 + L + d \cdot B_d$. Note that the number of defective d-tuples is $B_1^t + L + B_d^t \leq B^t$. The numbers $B^t$ are random variables, where $B^t$ depends only on the network $N^t$.

Lemma 2: Suppose a new node joins at time t+1. The probability of it picking a bad d-tuple is the expected number of bad d-tuples after time t, i.e., $E[B_1^t + L + B_d^t]/A$.

Proof: The probability of it picking a bad d-tuple after time t is $$\sum_i \frac{i}{A} prob(B_1^t + L + B_d^t = i) = \frac{\sum_i i \, prob(B_1^t + L + B_d^t = i)}{A}$$

$$= \frac{E[B_1^t + L + B_d^t]}{A}.$$

Lemma 3: Suppose a new node joins at time t+1. The expected loss in its bandwidth is $$\frac{E[B^t]}{A}.$$

Proof: Elementary. Follows from the network coding theorem [?]. Ω

An informal description of this process follows. If $B^t/A < pd$, then $B^{t+1}$ will be larger than $B^t$ in expectation; if $pd < B^t/A < 1-\epsilon$, then $B^{t+1}$ will be smaller than $B^t$ in expectation; finally, if $B^t/A$ is close to 1, then $B^{t+1}$ will again be larger than $B^t$ in expectation. Thus the fraction of bad d-tuples has a drift toward the small value pd as long as it does not get to close to 1. If it gets close to 1, it will drift to 1, and the system will collapse. A goal is to show that this collapse will not happen (except with a negligibly small probability) for a time that is exponential in $k/d^3$. Such a collapse cannot be avoided: with some probability, all nodes that join for a while will fail until no thread survives. The time before this happens is exponential in k.

Theorem 4: Before the system collapses, $$\frac{E[B^t]}{A} \leq (1+\epsilon)pd.$$

Once we prove this theorem we will need to show that the system does not collapse for time exponential in k. More exactly, Theorem 5: the expected number of steps before the collapse is at least $$\frac{1}{\xi_1} e^{\frac{\xi_2 k}{d^3}},$$

where $\xi_1$ and $\xi_2$ are two appropriately chosen constants.

The proof of this theorem will take several lemmas and is implied by Corollary 9.

Now focusing on the arrival of the t-th node first: For notational convenience, the superscript t is suppressed, and $B = B^t$ is written as, $B' = B^{t+1}$. When a failed node arrives, B tends to increase, and when a working node arrives B tends to decrease. Consider the t-th arriving node; suppose it picked a d-tuple denoted by D. The following lemma puts an upper bound on the maximum effect of this node on B.

Lemma 6:

$$|B' - B| \leq \frac{d^2}{k} A.$$

This bound cannot be improved in general; it is attained by the arrival of a single failed node at the beginning.

Proof. Let T be any d-tuple of threads with $|T \cap D| = j$. Then the maximum change in the connectivity of T (up or down) is j. The number of such d-tuples is $$\binom{d}{j}\binom{k-d}{d-j}$$

and their effect on B is at most $$j\binom{d}{j}\binom{k-d}{d-j} = d\binom{d-1}{j-1}\binom{k-d}{d-j}.$$

Summing this over all j gives:

$$d\sum_{j}\binom{d-1}{j-1}\binom{k-d}{d-j} = d\binom{k-1}{d-1} = \frac{d^2}{k}A.$$

If the arriving node is a failure then B can increase by at most $(d^2/k)A$. If the arriving node is a working node then we show that the decrease of B is substantial, at least in expectation. The following lemma is the heart of our analysis.

Lemma 7: If the total defect before a given step is B, and the new node is a working node, then the total defect after this step satisfies $$E[B'] \le B - B\frac{d}{k}\left(1 - \frac{d^2}{k} - \left(\frac{B}{A}\right)^{\frac{d-1}{d}}\right).$$

Proof. Note first that the defects of d-tuples do not increase. All the probabilities below will be conditional on $N_t$ and the event that the new node is working.

Consider a d-tuple F with connectivity d–j from the server, where $j \ge 1$. Consider a (d–j)-element edge-cut separating F from the server; among all such cuts, consider one for which the side of the cut containing F is maximum. It is well known that this maximum is unique. Let T denote the set of hanging threads on the same side of the cut as F, and let t=|T|. Any d-tuple chosen from these t threads will have connectivity at most d–j from the server, hence we get $$\binom{t}{d} \le B.$$

A subset $X \subset F$ can be chosen with $|X|=j$ so that F, X has d–j edge-disjoint paths to the server. F gets an additional connectivity when the arriving node picks at least one thread from X and at least one thread from outside T. We call this event a good event and the complement of this a bad event. A bad event is when either the threads picked are all from T or none from X. Using inclusion-exclusion, the probability of the bad event is:

$$\frac{\binom{t}{d}}{\binom{k}{d}} + \frac{\binom{k-j}{d}}{\binom{k}{d}} - \frac{\binom{t-j}{d}}{\binom{k}{d}}$$

Hence the probability of the good event is:

$$\frac{\left(\binom{k}{d}-\binom{k-j}{d}\right) - \left(\binom{t}{d}-\binom{t-j}{d}\right)}{\binom{k}{d}}$$

Let us try to lowerbound the first term of the numerator.

$$\binom{k}{d} - \binom{k-j}{d} = \sum_{i=1}^{j}\binom{k-i}{d-1}$$

We achieve a lowerbound on this by bounding the ratio of the i-th term with the first term on the right hand side.

$$\frac{\binom{k-i}{d-1}}{\binom{k-1}{d-1}} = \prod_{l=1}^{i-1}\frac{k-d-l+1}{k-l} \ge \left(\frac{k-d-i+2}{k-i+1}\right)^{i-1}$$

$$= \left(1 - \frac{d-1}{k-i+1}\right)^{i-1} \ge 1 - \frac{(i-1)(d-1)}{k-i+1} \ge 1 - \frac{(d-1)^2}{k-d+1}$$

Since we know that $k \ge d^2$, we can lowerbound the final term of the above inequality with $1-(d^2/k)$. This all together yields:

$$\binom{k}{d} - \binom{k-j}{d} \ge \left(1 - \frac{d^2}{k}\right)\sum_{i=1}^{j}\binom{k-1}{d-1} = j\left(1 - \frac{d^2}{k}\right)\binom{k-1}{d-1}$$

It is easy to show that $$\binom{t}{d} - \binom{t-j}{d} = \sum_{i=1}^{j}\binom{t-i}{d-1} \le j\binom{t-1}{d-1}.$$

Both together give a lower bound on the probability that the defect of F decreases:

$$\frac{\left(\binom{k}{d}-\binom{k-j}{d}\right) - \left(\binom{t}{d}-\binom{t-j}{d}\right)}{\binom{k}{d}} \ge j\frac{\left(1-\frac{d^2}{k}\right)\binom{k-1}{d-1} - \binom{t-1}{d-1}}{\binom{k}{d}}.$$

We also know that $$\binom{t}{d} \le B.$$

Using this we want to upperbound $$\binom{t-1}{d-1}$$

in terms of B. For convenience let us upperbound the $$\binom{t-1}{d-1} \Big/ \binom{k-1}{d-1}$$

in terms of B/A.

We claim that

$$\frac{\binom{t-1}{d-1}}{\binom{k-1}{d-1}} \leq \left(\frac{B}{A}\right)^{\frac{d-1}{d}}. \quad (1)$$

Indeed, $$\frac{\binom{t-1}{d-1}}{\binom{k-1}{d-1}} = \prod_{i=1}^{d-1} \frac{t-i}{k-i} \leq \left(\frac{t}{k}\right)^{d-1},$$

and hence $$\left(\frac{\binom{t-1}{d-1}}{\binom{k-1}{d-1}}\right)^d \leq \left(\frac{t}{k}\frac{\binom{t-1}{d-1}}{\binom{k-1}{d-1}}\right)^{d-1} = \left(\frac{\frac{t}{d}\binom{t-1}{d-1}}{\frac{k}{d}\binom{k-1}{d-1}}\right)^{d-1}$$

$$= \left(\frac{\binom{t}{d}}{\binom{k}{d}}\right)^{d-1} \leq \left(\frac{B}{A}\right)^{d-1}.$$

Using (1), the probability that the defect of F decreases can be bounded from below by $$j\left(\frac{\left(1-\frac{d^2}{k}\right)\binom{k-1}{d-1} - \binom{t-1}{d-1}}{\binom{k}{d}}\right) \geq \frac{jd}{k}\left(1 - \frac{d^2}{k} - \left(\frac{B}{A}\right)^{\frac{d-1}{d}}\right).$$

Hence the expected decrease in the total defect is at least $$\sum_j B_j \frac{jd}{k}\left(1 - \frac{d^2}{k} - \left(\frac{B}{A}\right)^{\frac{d-1}{d}}\right) = B\frac{d}{k}\left(1 - \frac{d^2}{k} - \left(\frac{B}{A}\right)^{\frac{d-1}{d}}\right).$$

This proves Lemma 7.
Let $$b = \frac{B}{A},$$

$$b' = \frac{B'}{A}.$$

We want to compare E[b'] with b (conditioning on $N_t$). By Lemma 7, $$E[b'] - b \leq \frac{pd^2}{k} - \frac{(1-p)d(k-d^2)}{k^2}b + \frac{(1-p)d}{k}b^{2-\frac{1}{d}}.$$

Let $f(b)$ denote the right hand side as a function of b. It is straightforward to check that $f$ is convex and has a minimum at $$a_0 = \frac{1 - d^2/k}{2 - 1/d} \approx \frac{1}{2}.$$

Furthermore, the minimum value of $f$ is less than $$-\frac{d}{8k}.$$

We also need information about the roots of $f$. The above discussion implies that $f$ has two roots $0 < a_1 < \frac{1}{2} < a_2 < 1$ in the interval [0,1], and it is not hard to see that $$a_1 = \frac{pd}{(1-p)\left(1 - \frac{d^2}{k}\right)}(1 + \varepsilon),$$

where $$0 < \varepsilon < (2pd)^{1-1/d}.$$

The other root (which is less interesting for us) satisfies $$a_2 = 1 - \left(\frac{pd}{1-d} + \frac{d^2}{k}\right)(1 + \varepsilon),$$

where $$|\varepsilon| < 2\left(\frac{1}{d} + \frac{d^2}{k}\right).$$

The first root proves Theorem 4. Theorem 4 remains valid as long as we do keep the total defect (i.e., B') less than $a_2A$. If we get a network with total defect at least $a_2A$ then our network may collapse. For Theorem ? to be meaningful we should prove that the expected time for the collapse to happen is exponentially large. Towards this goal let us solve the equation $f(b) \leq -c_1$, where $c_1 > 0$. For these values of b, B' tends to be significantly smaller than B. Again one can show that the equation $f(b) \leq -c_1$ has two roots. Let us call them $b_1$ and $b_2$. One can also show that the difference between them is at least a constant, denote it by $\delta_1$, for sufficiently small $c_1$. $c_1 = \delta_2 d/k$, works for sufficiently small constant $\delta_2$.

Now let us construct an infinite graph. The node set V, of the graph are partitioned in vertices $V_t$. $V_t$ is the set of all possible networks we could encounter after t steps. We partition the node set in two more ways. One $V = U_0 \cup U_1 \cup U \cup U_A$, where $U_i$ is the set of all networks with total defect i. Two, $V = W \cup X \cup Y \cup Z$, where $W = U_0 \cup U \cup U_{n\ b_1An}$, $X = U_{n\ b_1An} \cup U \cup U_{n(b_1+(d^2/k))An}$, $Y = U_{n(b_1+(d^2/k))An} \cup U \cup U_{n\ b_2An}$ and $Z = U_{n\ b_2An} \cup U \cup U_A$. For convenience put $b = b_2 - (b_1 + (d^2/k))$.

We put an edge from a node u to v, if the network corresponding to u can become a network corresponding to v by the arrival of a single node. The weight of the edge is the corresponding probability of u becoming v in one step. Now let us start a random walk from a node in $U_0$ corresponding to the network with one node and i.e., server. Let us compute the expected number of steps to reach a node in Z. Since Lemma 6 put a bound on the maximum jump this random walk can make, it is sufficient to estimate the probability of crossing Y.

Lemma 8: Start a new random walk at some node in X. The probability that the random walk reaches Z before reaching X or W is at most $\xi_1 e^{-\xi_2 k/d^3}$, where $\xi_1$ and $\xi_2$ are appropriately chosen constants.

Proof. Our random walk is not a martingale but it resembles a submartingle if we follow the subscript of U's. Our proof also resembles the proof of Azuma's inequality in martingales. Let $X_i$ be a random variable, which measures the change in the subscript of U's in the i-th step. Lemma 6 tells us that $X_i < (d^2 A)/k$. Let t be a positive integer. We want to find:

$$prob(X_1+X_2+L+X_t \geq bA) = prob(e^{(\beta(X_1+X_2+L+X_t)-\beta bA)} \geq 1) \leq$$
$$E[e^{(\beta(X_1+X_2+L+X_t)-\beta bA)}] = e^{-\beta bA} E[e^{\beta(X_1+X_2+L+X_t)}] =$$
$$e^{-\beta bA} E[e^{\beta(X_1+X_2+L+X_{t-1})} E[e^{\alpha X_t}]].$$

Here $\beta$ is some positive constant to be optimized later. The first inequality follows by Markov's inequality. The nested expectation is conditioned on the network obtained after the t-1 steps. Note that we terminate our random walk if we reach Z. We also terminate our random walk if we are in X or W after the start. So we are in Y. For networks in Y we know that $E[X_t] \leq -(A\delta_2 d)/k$. We also know the maximum change. Using this and convexity of $e^x$ we get:

$$E[e^{\beta X_t}] \leq \frac{d+\delta_2}{2d} e^{-\frac{\beta d^2 A}{k}} + \frac{d-\delta_2}{2d} e^{\frac{\beta d^2 A}{k}}.$$

We choose $\beta$ so that $e^{\beta d^2 A/k} = \sqrt{(d+\delta_2)/(d-\delta_2)}$. With some simplifications this gives:

$$prob(X_1 + X_2 + L + X_t \geq bA) \leq \left( \sqrt{\frac{1-\frac{\delta_2}{d}}{1+\frac{\delta_2}{d}}} \right)^{\frac{kb}{d^2}} \left( \sqrt{1-\frac{\delta_2^2}{d^2}} \right)^t.$$

This implies that the probability that the random walk reaches Z before returning back to W or X is bounded above by:

$$\frac{\left( \sqrt{\frac{1-\frac{\delta_2}{d}}{1+\frac{\delta_2}{d}}} \right)^{\frac{kb}{d^2}}}{1-\sqrt{1-\frac{\delta_2^2}{d^2}}}.$$

Choosing two new constant $\xi_1$ and $\xi_2$ we can upperbound the above by $$\xi_1 e^{-\frac{\xi_2 k}{d^3}}.$$

Lemma 9: The probability of collapse within t steps is at most $$t\xi_1 e^{-\frac{\xi_2 k}{d^3}}.$$

Lemma 9 implies the Theorem 5. We start the random walk in W. We do not count the number of steps until it reaches some node in X. Once it reaches X, we count it one megastep when the random walk starting from X returns back to X or W or reaches Z. We call a megastep a success if it reaches Z. We know that the probability that a megastep is a success is exponentially small. So the random walk must make exponentially many megasteps before it has a reasonable probability of success. This proves Theorem 5.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
    building a peer-to-peer overlay network with a random graph topology using an overlay protocol on a source that operates in association with the overlay protocol on a node, wherein network connections are available from the source and the network connections comprise threads hanging from the source, each network connection carrying a unit of bandwidth;
    connecting the node to a first number of network input connections, wherein the first number of network input connections are a subset of the network connections available from the source and randomly assigned by the source;
    receiving an original set of packets from at least one source over the first number of network input connections;
    generating a new set of packets by implementing a network coding at the node for generating a packet that is a combination of at least two packets from the original set of packets by encoding packets from the original set of packets into random linear combinations of new packets;
    incorporating within each random linear combination of new packets a coefficient necessary for a child node to decode the random linear combination of new packets into the original set of packets; and
    forwarding the new set of packets to the child node over a second number of network output connections.

2. A method as recited in claim 1, wherein the source is selected from the group comprising:
    a server device that is an original source of the original set of packets; and
    a parent node that has forwarded the original set of packets.

3. A method as recited in claim 1, further comprising:
    copying the original set of packets; and
    storing the copy of the original set of packets in a media cache.

4. A method as recited in claim 1, further comprising:
    sending a request to join a network that includes the at least one source and the at least one child node; and joining the network, the joining comprising connecting to available network connections from at least one of the source or a node where the network connections are randomly assigned by the source.

5. A method as recited in claim 1, further comprising providing the second number of output connections such that the number of output connections is the same as the number of input connections.

6. A method as recited in claim 4, further comprising:
sending a request to leave the network; and
leaving the network by disconnecting from the network input connections.

7. A method as recited in claim 6, wherein leaving the network is a result of the at least one source redirecting the first number of network input connections to the at least one child node.

8. A computer-readable storage medium comprising computer-executable instructions configured to perform the method of claim 1.

9. A computer-readable storage medium comprising computer-executable instructions configured for:
providing a total of k network connections that enable nodes to connect to a server, where k is a positive integer indicating a number of network connections, wherein the network connections comprise threads hanging from the server, each network connection carrying a unit of bandwidth;
receiving a request from a first node to connect to d threads, where d is a positive integer indicating a number of equal units of bandwidth of the first node;
randomly assigning, by the server, d network connections from the k network connections to join the first node to the network, wherein d is from 1 to k;
outputting the d network connections from the first node to maintain the total of k network connections available for a second node, wherein the d network connections are provided from the first node and (k−d) network connections are provided from the server, and wherein the first node generates new packets that are random linear combinations of at least two packets from an original set of packets; and
incorporating within each random linear combination of new packets a coefficient necessary for the second node to decode the random linear combinations of new packets into the original set of packets.

10. A computer-readable storage medium as recited in claim 9, having further processor-executable instructions configured for instructing a parent node to begin sending data to a child node, wherein the parent node is a node presenting the d network connections randomly assigned to the first node.

11. A computer-readable storage medium as recited in claim 9, having further computer-executable instructions configured for:
maintaining an N×k matrix that mirrors a network, where N represents a number of nodes currently in the network and k is a positive integer indicating the number of network connections, wherein the N×k matrix is constructed and maintained on the server by an overlay protocol; and
adding a row to the matrix when a new node is joined to the network, wherein the row comprises d ones representing network connections from the server to the node and (k−d) zeros representing network connections from the server not consumed by the new node.

12. A computer-readable storage medium as recited in claim 11, having further computer-executable instructions configured for:

receiving a request from an existing node to leave the network; and
instructing a parent node of the existing node to redirect the randomly assigned network connection to children nodes of the existing node.

13. A computer-readable storage medium as recited in claim 12, having further computer-executable instructions configured for deleting a row in the matrix that corresponds to the existing node.

14. A system comprising:
memory;
a server coupled to the memory is configured to provide a plurality of network connections, wherein each one of the plurality of network connections comprises a thread hanging from the server, each network connection carrying a unit of bandwidth;
a client node capable of joining a peer-to-peer network comprising the server and a plurality of other nodes, the client node configured to join the network by occupying a particular number of network connections as inputs and by providing the particular number of network connections as outputs, wherein the network connections are provided by at least one of the server or another node; and
a network coding module residing on the client node and configured to:
encode original incoming packets into new packets that are random linear combinations of the original incoming packets:
include within each new packet a coefficient needed for one or more child nodes to decode the random linear combination of new packets into the original set of packets: and
forward the new packets to one or more child nodes.

15. A system as recited in claim 14, further comprising a network matrix that mirrors the network, the matrix having N rows and k columns, each row representing a node currently joined with the network and each column representing a network connection to which nodes can connect to the network, wherein the network matrix is constructed and maintained on the server by an overlay protocol and each row comprises d ones representing network connections to the server to the network and (k−d) zeros representing network connections not consumed by the node.

16. A system as recited in claim 15, further comprising an overlay protocol configured to build and maintain the network matrix and to randomly assign network connections to new nodes joining the network.

17. A method as recited in claim 1, further comprising providing the second number of output connections such that:
the number of output connections is the same as the number of input connections;
the number of output connections is greater than two; and
the number of output connections is less than a total number of network connections available from the source.

18. A method as recited in claim 1, wherein the second number of network output connections comprise a bandwidth of the node divided into equal units of bandwidth.

19. A computer-readable storage medium as recited in claim 9, wherein the randomly assigning comprises performance of the randomly assigning in conjunction with at least one of a proximity, a locality, or a neighborhood information.

20. A system comprising a server with a memory encoding instructions configured to perform the method of claim 1.

* * * * *